(12) United States Patent
Di Fabbrizio et al.

(10) Patent No.: US 8,185,399 B2
(45) Date of Patent: May 22, 2012

(54) SYSTEM AND METHOD OF PROVIDING AN AUTOMATED DATA-COLLECTION IN SPOKEN DIALOG SYSTEMS

(75) Inventors: Giuseppe Di Fabbrizio, Florham Park, NJ (US); Dilek Z. Hakkani-Tur, Denville, NJ (US); Mazin G. Rahim, Warren, NJ (US); Bernard S. Renger, New Providence, NJ (US); Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1215 days.

(21) Appl. No.: 11/029,798

(22) Filed: Jan. 5, 2005

(65) Prior Publication Data

US 2006/0149555 A1    Jul. 6, 2006

(51) Int. Cl.
*G10L 21/00* (2006.01)
*G10L 19/00* (2006.01)
*G06F 17/27* (2006.01)

(52) U.S. Cl. ............................ 704/275; 704/9; 704/230

(58) Field of Classification Search .......... 704/231–257, 704/270–278
See application file for complete search history.

(56) References Cited

U.S. PATENT DOCUMENTS

| 6,021,384 | A | * | 2/2000 | Gorin et al. | ........................ 704/1 |
| 6,044,337 | A | * | 3/2000 | Gorin et al. | ........................ 704/1 |
| 6,173,261 | B1 | * | 1/2001 | Arai et al. | ...................... 704/257 |
| 2003/0105634 | A1 | * | 6/2003 | Abella et al. | ................... 704/257 |
| 2003/0130841 | A1 | | 7/2003 | Bangalore et al. | |

OTHER PUBLICATIONS

Tur et al, "Active Learning for Spoken Language Understanding", ICASSP 2003, p. 276-279.*
Hakkani-Tur et al., "Unsupervised and active learning in automatic speech recognition for call classification", Acoustics, Speech and Signal Processing 2004, IEEE International Conference on Montreal, Quebec, Canada May 17-21, 2004, vol. 1, pp. 429-432.
Riccardi et al., 'Active and unsupervised learning for automatic speech recognition', Eurospeech 2003, Sep. 2003, p. 1825.
Ammicht et al., "Knowledge collection for natural language spoken dialog systems", Eurospeech 1999, vol. 1, Sep. 1999, p. 1375.
Ebgert Ammicht, Allen Gorin, Tirso Alonso, "Knowledge Collection for Natural Language Spoken Dialog Systems". AT&T Laboratories.

* cited by examiner

*Primary Examiner* — Samuel G Neway (57) ABSTRACT

The invention relates to a system and method for gathering data for use in a spoken dialog system. An aspect of the invention is generally referred to as an automated hidden human that performs data collection automatically at the beginning of a conversation with a user in a spoken dialog system. The method comprises presenting an initial prompt to a user, recognizing a received user utterance using an automatic speech recognition engine and classifying the recognized user utterance using a spoken language understanding module. If the recognized user utterance is not understood or classifiable to a predetermined acceptance threshold, then the method re-prompts the user. If the recognized user utterance is not classifiable to a predetermined rejection threshold, then the method transfers the user to a human as this may imply a task-specific utterance. The received and classified user utterance is then used for training the spoken dialog system.

29 Claims, 3 Drawing Sheets

SYSTEM AND METHOD OF PROVIDING AN AUTOMATED DATA-COLLECTION IN SPOKEN DIALOG SYSTEMS

RELATED APPLICATIONS

The present invention is related to U.S. patent application Ser. No. 11/029,319, entitled "A LIBRARY OF EXISTING SPOKEN DIALOG DATA FOR USE IN GENERATING NEW NATURAL LANGUAGE SPOKEN DIALOG SYSTEMS," U.S. patent application Ser. No. 11/029,317, entitled "A SYSTEM AND METHOD FOR USING A LIBRARY TO INTERACTIVELY DESIGN NATURAL LANGUAGE SPOKEN DIALOG SYSTEMS," and U.S. patent application Ser. No. 11/029,318, entitled "BOOTSTRAPPING SPOKEN DIALOG SYSTEMS WITH DATA REUSE." The above U.S. patent applications are filed concurrently herewith and the contents of the above U.S. patent applications are herein incorporated by reference in their entirety.

BACKGROUND OF THE INVENTION

1. Field of the Invention

The present invention relates to providing a spoken dialog system and more specifically to providing an automated data-collection component to the design process of building a spoken dialog system.

2. Introduction

Figure 1:
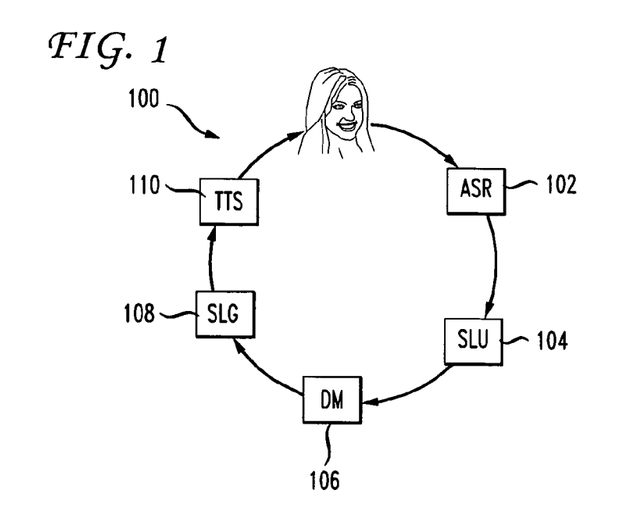
FIG. 1 illustrates a basic spoken dialog system.

The present invention relates to spoken dialog systems. FIG. 1 illustrates the general features of such a dialog system 100 that enables a person to interact with a computer system using natural language. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning of the speech input as input and may determine an action, such as, for example, providing a spoken response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Natural language spoken dialogue systems 100 aim to identify user intents and take actions accordingly, to satisfy their requests. One purpose of such systems is to automate call routing where the task is to classify the intent of the user, expressed in natural language, into one or more predefined call-types. Then, according to the utterance classification call-type, contextual information and other service parameters, the DM 106 would decide on the next prompt or direct the call to a specific destination such as an automated Interactive Response System (IVR) or a live operator. As a call classification example, consider the utterance "I would like to know my account balance," in a customer care banking application. Assuming that the utterance is recognized correctly, the corresponding intent or the call-type would be Request (Account_Balance). The action would be to prompt for the account number and provide the account balance or route the call to the Billing Department.

Typically some initial task data are needed for designing the system and determining the nature of the call-types. This data can then be used in training the ASR module 102 and the SLU 104 classifier models to bootstrap the initial version of the system. Since human-human interactions are very different from human-machine interactions in terms of style, language and linguistic behavior, initial data is collected via hidden human agent systems. Some have referred to these hidden human agents as "wizard-of-oz" agents. In such systems, the users only interact with a hidden human agent who simulates the behavior of the system in such a way that the caller believes he is interacting with the real system. The amount of data required to properly capture the caller's naturally expressed intentions varies and depends on the application domains. Best practice in the natural language service field suggests that ten or fifteen thousand utterances are needed to bootstrap a system with reasonable ASR and SLU coverage. In these real-world service scenarios, the systems tend not to scale in terms of cost and time required to complete the initial data collection.

For routing applications, where the user intentions are typically expressed in the first few turns of the dialogue, a simpler approach, which may be called a "ghost wizard", has been used in some natural language data collections without requiring a human 'behind the curtains'. In that case, the initial system greets users and records one or two user responses. Although a ghost wizard approach scales better for large data collections since it does not require a live person, the ghost wizard does not handle generic discourse illocutionary acts like vague questions, greetings, thanks and agreements that have little or no relevance for the actual service task. Also, in cases where the user has made a specific request in the first turn, the ghost wizard may result in user annoyance.

What is needed in the art is an improved system and method of providing data collection when designing and building a spoken dialog system. Such a system should enable scaling and improved collection of data.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention is systems, methods and computer-readable media for gathering data for use in a spoken dialog system. An embodiment of the invention is generally referred to as an automated hidden human that performs data collection automatically at the beginning of a conversation with a user in a spoken dialog system. The method comprises training an initial ASR and SLU models and associated DM using the existing task-independent data from previous applications, presenting an initial prompt to a user, recognizing a received user utterance using this automatic speech recognition (ASR) engine and classifying the recognized user utterance using this spoken language understanding (SLU) module. If the recognized user utterance is understood or classifiable to a predetermined acceptance threshold, then the method prompts the user according to the call flow for the understood call-type. If the recognized user utterance is not classifiable to a predetermined rejection threshold, then the method transfers the user to a human and the utterances are then stored, transcribed, and labeled by a human labeler and then used for training the spoken dialog system. If the recognized user utterance is not understood or classifiable to a predetermined acceptance threshold, then the method comprises re-prompting the user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Designing and building natural language spoken dialogue systems require large amounts of speech utterances, which adequately represent the intended human-machine dialogues. For this purpose, typically, first automated hidden human agent data collection is performed, and then the collected data is transcribed and labeled by expert labelers. Finally, the data is used to train both the speech recognizer language and the spoken language understanding stochastic models. The hidden human agent method requires a human operator to simulate the interaction with the callers according to a specific dialogue strategy. Usually the callers are unaware that the system is simulated by a human and behave as if they were interacting with a machine. For a routing application, where the user intentions are typically expressed in the first few turns of the dialogue, a simpler approach of using the ghost wizard could properly capture the linguistic behavior of the caller without requiring a human operator. Both methods turned out to be better than recording user-agent (human-human) dialogues, since the responses to machine prompts are significantly different than responses to humans, in terms of language characteristics.

The present invention addresses the problem of using hidden humans for data collection and introduces a completely automated hidden human, which is capable of recognizing and understanding application independent requests, and improving the informativeness of the collected data. When compared to the hidden human agent data collection systems, the automated hidden human of the present invention better captures the user intentions and produces substantially shorter interactions with the callers resulting in a better user experience and a less intrusive approach in the customer call center traffic.

The completely automated hidden human of the present invention is capable of recognizing and understanding application independent requests and provides some level of dialogue repair to effectively encourage the users to express the reason of the call to the machine. This improves the informativeness of the data collected, since the system would then collect more task-specific intents, which is very important for the design of the application. Furthermore, the automated hidden human uses task-independent ASR and SLU models, which means a system is deployed for the application from the very first day, so it is straightforward to replace this with improved task specific DM, ASR and SLU models.

Figure 2:
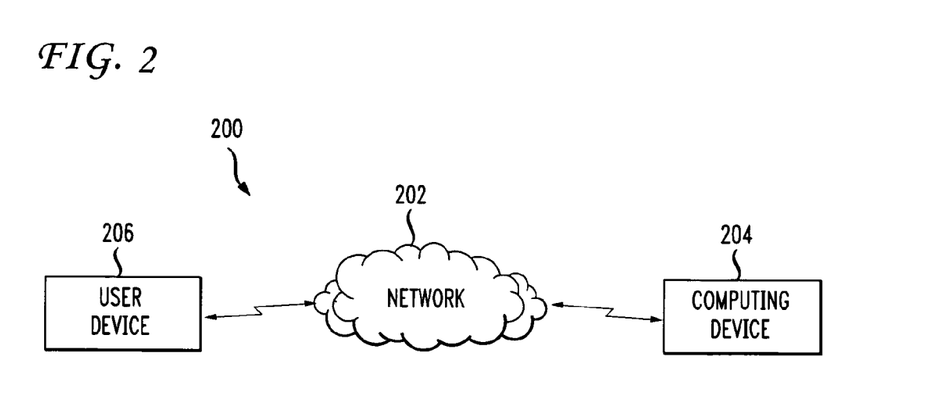
FIG. 2 illustrates the basic architecture wherein the automated wizard operates and communicates with a user

The architecture used for the automated hidden human may be any computing device that can be programmed in any known programming language to perform the steps of the invention. The computing device may be a server communicating with a user over the Internet, in a VoIP communication architecture, via a phone system whether land-based or wireless, and so forth. The basic components of the system 200 are shown in FIG. 2. A user communicates with a user device 206 which may be any computing device that includes a microphone component to receive the user's speech and converts the speech into a data format for transmission over a network 202 to a computing device 204. The network may be any network used to communicate between two devices. For example, possible networks include at least the following: PSTN (Public Switched Telephone Network), any telephone network, wireless network of any protocol, VoIP, WiFi, any IP-based network or packet network, LAN and so forth. Examples of the user device are a standard telephone, a computer with a phone application and a microphone, a mobile device such as a cell phone, smartphone, Palm®-based device, or Blackberry® device and the like. The computing device 204 may be a computer server or group of servers that are programmed to receive the voice data from the user and process the data according to the principles of the invention set forth herein. As is known in the art, the computing device will incorporate hardware components such as a central processor, bus, network communication means, memory and so forth.

At a high level of abstraction, one example of a spoken dialog system (SDS) is a phone-based VoiceXML system with specific extensions to address Natural Language needs. Typically, once a phone call is established, the dialogue manager 106 prompts the caller and activates a top level ASR grammar. The caller's speech is then transcribed and sent to the SLU 102 which replies with a semantic representation of the utterance. Based on the SLU reply and the implemented dialogue strategy, the DM 106 engages a mixed initiative dialogue to drive the user towards the goal. The DM 106 iterates the previously described steps until the call reaches a final state (e.g., the call is transferred to a Customer Service Representative (CSR), an IVR or the caller hangs up).

In an automated hidden human embodiment of the invention, automatic utterance recording is enabled during the speech recognition process, where the ASR 102 is also responsible for end pointing the caller's utterance boundaries. The dialog trace is logged into the system using specific dialog markers to easily identify the execution of the dialogue. Each system components will be described next.

Automatic speech recognition that is robust and operable in real-time is an important component of a spoken dialogue system. A preferable speech recognizer uses trigram language models based on Variable N-gram Stochastic Automata. See, e.g., G. Riccardi, R. Pieraccini, and E. Bocchiere, "Stochastic automata for language modeling" *Computer Speech and Language*, Vol. 10, pp. 265-293, 1996, incorporated herein by reference. The acoustic models are preferably subword unit based, with triphone context modeling and variable number of gaussians (4-24). The output of the ASR engine (which can be the 1-best or a lattice) is then used as the input of the SLU component.

In a natural spoken dialogue system with an SLU module 102, the definition of "understanding" depends on the application. In this work, we focus only on goal-oriented call classification tasks, where the aim is to classify the intent of the user into one of the predefined call-types. Classification is employed for all utterances in all dialogues as seen in the sample dialogues shown below. Thus all the expressions the users can utter are classified into pre-defined call-types (e.g., Request(Account_Balance)) before starting an application. Even the utterances which do not contain any specific information content get a special call-type (e.g., Hello). In experiments, an extended version of a Boosting-style classification algorithm was used for call classification. See, e.g., Robert E. Schapire and Yoram Singer, "BoosTexter: A Boosting-based System for Text Categorization", *Machine Learning*, vol. 39, no. 213, pp. 135-168, 2000, incorporated herein by reference.

In a mixed-initiative spoken dialogue system, dialogue management by the DM module 106 is an important component responsible for the human-machine interaction. The DM 106 keeps track of the specific discourse context and provides disambiguation and clarification strategies when the SLU call-types are ambiguous or have associated low confidence scores. It also extracts other information from the SLU response such as in order to complete the information necessary to provide a service.

The ghost wizard approach was introduced above. In the literature, in order to determine the application-specific call-types, first a "wizard" data collection is performed. See, e.g., E. Ammicht, A. L. Gorin, and T. Alonso, "Knowledge collection for natural language spoken dialog systems," in *Proceedings of the Eurospeech*, Budapest, Hungary, September 1999, incorporated herein by reference. In this approach, a human, i.e., wizard, acts like the system, though the user of the system does not know about this. The following dialog presents an example dialogue from a ghost wizard system. The first and second prompts are always the same independent of what the user says. Then the caller is always directed to a human.

System: How may I help you?
User: I'd like to know what the interest rate is at right now
System: Sorry, I could not get that, how may I help you?
User: I need information about rates It is evident that the second turn is not necessary. The initial intent was expressed already, so, in the subsequent interaction, the annoyed caller provides a shorter and simpler reply probably assuming that the system is not really capable of understanding him. A real system would be able to address correctly the request without further clarifications. The second utterance is a ghost wizard artifact and should not be included in the training set to avoid alteration of the natural distribution of the call-types.

The proposed automated version of the human hidden agent does not handle task specific requests, since there is no labeled data to train it, but it can handle task independent cases, such as requests for talking to a human agent, and discourse call-types, such as "Hello". The following dialog presents a dialogue which is more useful while designing the application and training the ASR and SLU models.

System: How may I help you?
User: Hello?
Discourse Call-type: Hello
System: Hello, how may I help you?
User: I need to talk to somebody.
Task-independent Call-type: Request(Call_Transfer)
System: You can go ahead and speak naturally to me. Just briefly tell me how I may help you.
User: I need to know my account balance.
Task-specific Call-type: Request(Account_Balance)

In this example the, automated hidden agent first plays the prompt "How may I help you?", then the user's response is recognized by the ASR module, and the ASR output is classified using the SLU 104. If the SLU class is not understood with high enough confidence or understood as "task specific", then the aim of wizard data collection is realized, so the customer is transferred to a customer service representative without further hassle. If the SLU class is "generic", this means that the user either uttered a discourse sentence, such as "Hello", or asked for an application independent request, such as a vague intent (e.g., "I have a question") or a request to speak to a live customer service representative. In the final two cases, the user is re-prompted, and the dialogue can proceed for several more turns. As seen in the example dialogue above, this ensures more informative data collection than the ghost wizard approach, with less hassle to the user.

This approach also eliminates the cost of the hidden human approach, as there is no human involved. It can also be used to improve the hidden human approach, by allowing the customer service representative to hear the concrete utterance during the transfer.

The system also re-prompts the user if the intent is not classified with a satisfactory confidence, the user was silent, the ASR rejected the utterance or other irrelevant discourse call-types were detected. As a result, the automated hidden human optimizes data collection by eliminating obviously bad utterances from needing to be transcribed and labeled.

Figure 5:
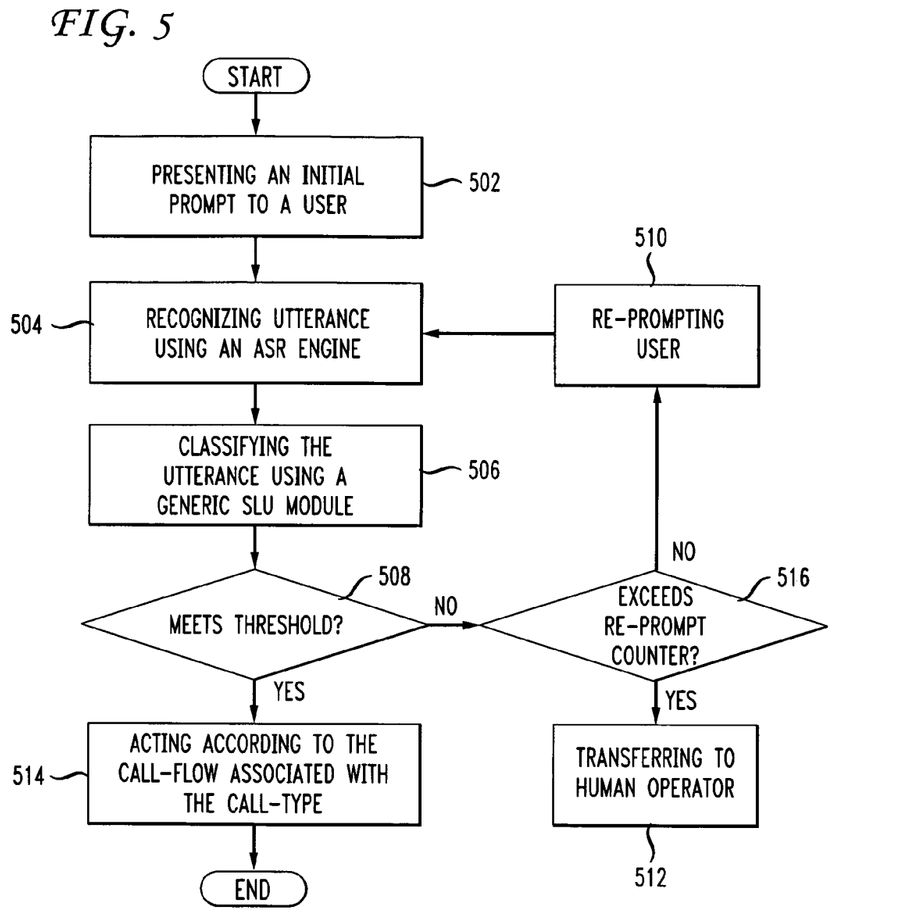
FIG. 5 illustrates a method embodiment of the invention.

FIG. 5 illustrates an example method embodiment of the invention. This method is practiced by one or more components within a spoken dialog system, such as the ASR module, the SLU module and a DM module. The method is used for gathering data for use in training a spoken dialog system. The spoken dialog system will likely have a particular domain that it will operate in, such as, for example, a bank or a travel agency business. The method comprises, after training ASR and SLU models and DM using the transcribed and labeled data of task-independent (generic) call-types from previous applications, presenting an initial prompt to a user (502), recognizing a received user utterance using an automatic speech recognition engine (504) and classifying the recognized user utterance using a spoken language understanding module (506). This SLU module is preferably a generic module. If the recognized user utterance is not understood or classifiable to a predetermined threshold (508), then the method involves re-prompting the user (510). The system may also include a step of determining whether the re-prompt would exceed a re-prompt counter (516). For example, the system may only re-prompt the user once or twice. The threshold if step 508 may be, for example, a predetermined acceptance threshold. The prompt used in the re-prompt may be the same prompt as provided earlier or a different prompt to move the dialog forward. The threshold may relate to an entity such as a named entity or an information entity. An entity-related task such as identifying named entities such as, for example, a named person, named organizations, dates, times, monetary amounts and percentages. Those of skill in the art will understand the requirements for identifying entities such as named entities from speech.

If the recognized user utterance is not classifiable to a threshold (508), then the method comprises transferring the user to a human (512). The threshold in this case may comprise a predetermined rejection threshold. Further, this step may or may not involve utilizing the step of determining whether a re-prompt counter is exceeded (516). When the call is transferred to a human agent, the received and classified user utterance are preferably then used for training one or more modules of the spoken dialog system. If the recognized utterance is understood or classifiable with a confidence more than a threshold (508), then the method comprises acting according to the call-flow associated with the call-type (514). In this regard, the threshold may be a predetermined acceptance threshold. In FIG. 5, a more general case is assumed where the acceptance and rejection threshold are the same. However, as mentioned above, the threshold illustrated may represent an acceptance threshold and a separate rejection threshold. These thresholds may be both applied or only one threshold may be applied.

There are experimental results which illustrate the comparison of the ghost wizard and automated hidden human approaches. To characterize and compare the performances of the new automated hidden human with the existing system, an experiment was conducted using a ghost wizard-collected corpus with two dialogue turns. 11,653 utterances were transcribed, labeled and used to simulate the same task in the automated hidden human environment. 5,891 of them are from the first turn, and 5,762 from the second turn. The difference is due to the hang-ups of the users after the first turn. The average number of words per utterance is 10.4. In this application, there are 36 call-types; 11 of them are generic, covering 37% of the test set. The speech recordings have been sent to the generic ASR and the resulting recognized string has been passed to the SLU classifier. The resulting call-types were finally used to simulate the dialogue interaction.

To bootstrap a statistical language and an acoustic model for ASR, human-machine utterances were used from previous spoken dialog applications. ASR word accuracy is found to be 72.1% on this corpus.

According to the human labels, 45% of the users responded to the first prompt with a generic utterance, whereas this number reduces to 17% in the second turn. The rest of the users in both turns responded with a task specific intent. 70% of the users, who responded to the first prompt with a generic utterance, responded to the second prompt with a task specific utterance. This is actually an upper bound performance for the automated hidden human. If the automated hidden human can correctly detect the 55% of the users who responded to the first prompt with a task specific request, then we can directly transfer those users to the representative without further hassle.

The SLU classifier model is also trained using human-machine utterances from previous applications. The application specific call-types are mapped to a single call-type called "specific" whereas the generic (e.g., application independent) call-types are kept as is.

Figure 3:
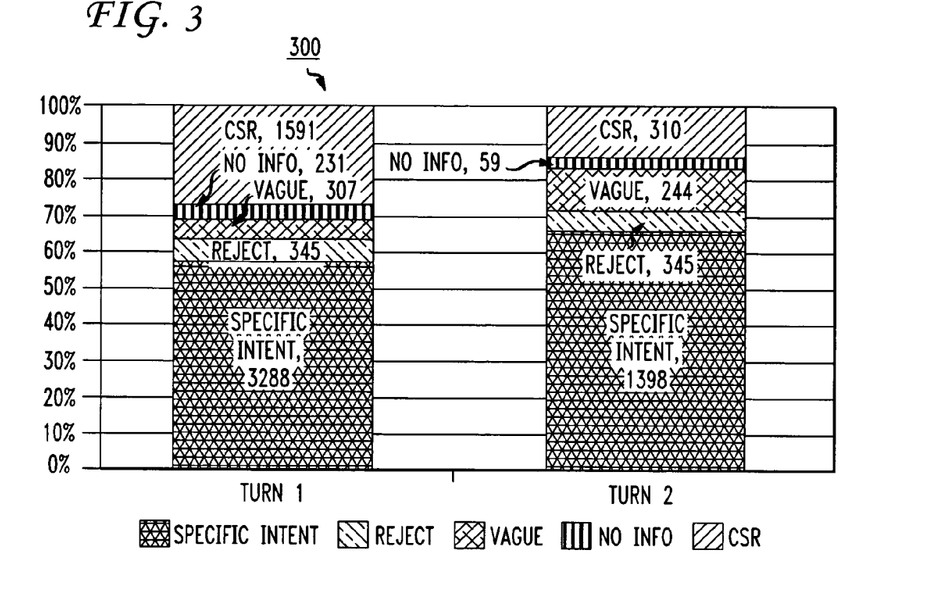
FIG. 3 illustrates a call-type distribution with ASR output.
Figure 4:
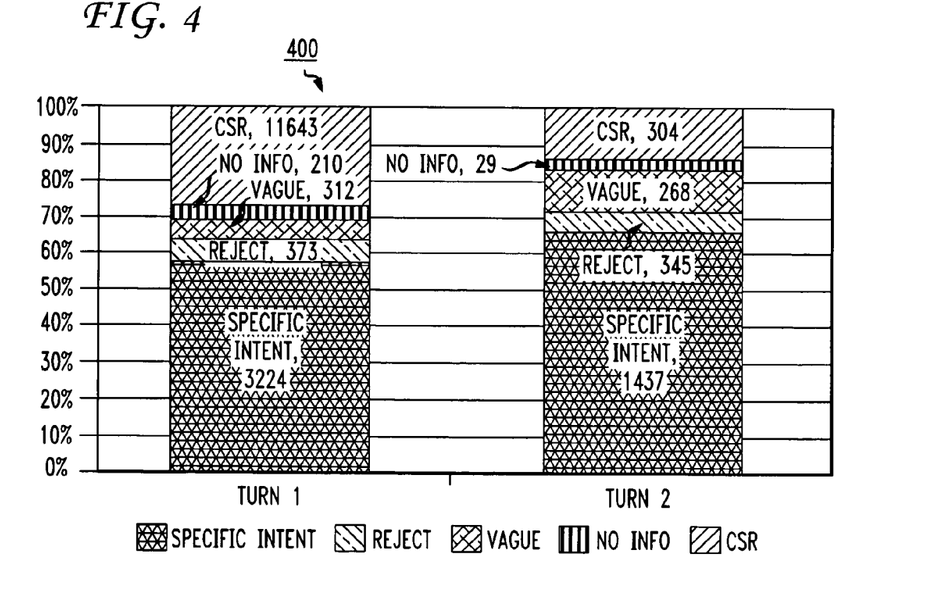
FIG. 4 illustrates a call-type distribution with transcribed utterances.

FIG. 3 and FIG. 4 show the detailed distributions 300, 400 of the call-types assigned by the SLU 104 when the ASR output and the manually transcribed utterances are used respectively. Generic requests are further divided into: CSR, discourse (no information), and vague questions (vague). Rejections, due to low confidence classifications or silence timeouts, are included in the 'reject' label. According to the actual automated hidden human call flow, the user may get prompted a third time if a sequence reject-vague (or vice versa) was detected, but since those are very rare occurrences, we limited our evaluation to the first two turns. The diagrams show comparable performances in both transcribed and speech recognized output, possibly due to the compensating effect of the SLU.

One other work in the area of error handling strategies is described in Gabriel Skantze, "Exploring human error handling strategies: implications for spoken dialogue systems", *ISCA Tutorial and Research Workshop on Error Handling in Spoken Dialogue Systems*, Chateau-d'Oex-Vaud, Switzerland, Aug. 28-31, 2003, incorporated herein by reference. Although this work introduces a real ASR to report the recognized utterance to the automated hidden human, the final dialogue strategy decisions are biased by a human instead of relying upon a fully functional SLU. In the present invention, the DM introduces an error recovery strategy based on ASR and SLU rejections which is very close to the actual final system behavior.

TABLE 1

|  | Turn 1 | | Turn 2 (all) | | Turn 2 (gen) | |
| --- | --- | --- | --- | --- | --- | --- |
|  | Ratio | Acc. | Ratio | Acc. | Ratio | Acc. |
| generic | 35% | 72% | 20% | 30% | 28% | 31% |
| specific | 65% | 70% | 80% | 93% | 72% | 94% |

When all the utterances in the second turn are considered, the SLU classifies 80% of them as task specific with an accuracy of 93%. On the other hand, the accuracy for the utterances classified as generic is only 30%.

When only the second turn utterances of the users are considered, whose responses to top prompt are found to be generic, it is seen that 72% of these are now task specific with an accuracy of 94%. The accuracy for the generic utterances is 31%.

Next, the automated hidden human approach is compared to other approaches. A further experiment briefly compares data collections in two substantially different domains. The automated hidden human was used for two data collections and recorded around 10 k dialogues for each campaign during a two week period. Real time reporting monitored the progress of the collection summarizing the total number of calls, partitioning the utterances by call-type and identifying the uncollaborative calls based upon the calls routed without classified user's intent. Table 2 shows a comparison of the two data collections. Wizard 1 has been used in the consumer retail domain, while wizard 2 collected data for a telecommunication customer care service. The term "wizard" in table 2 relates to the automated hidden human systems of the present invention. Utterances are longer (33 sec) in the second application due to the more articulated requests from the callers. The first application was simpler in terms of number and varieties of requests. Few call-types covered most of the Wizard 1 needs. This can be seen from the table where only 1.72% of the requests at the first turn were generic and 77.54% were recovered by the second turn. The second application turned out to be more complex and broader in scope. Almost 30% of the initial requests were generic and 46.83% provided application specific intents in the second turn.

TABLE 2

|  | Wizard 1 | Wizard 2 |
| --- | --- | --- |
| Average Turns Duration (sec) | 24 | 33 |
| Generic Intent $1^{st}$ turn | 1.72% | 29.58% |
| Specific Intent $2^{nd}$ turn | 77.54% | 46.83% |

In both cases the duration of the calls was rather short, most of the calls were limited to a single turn interaction, and the resulting data collected were focused more on the application specific tasks.

The automated hidden human data collection approach for spoken dialogue systems provides improvements over prior approaches. It is demonstrated that, using generic ASR and SLU models and a basic dialogue manager strategy, the data collection quality can be improved, caller acceptance rates are increased, the real spoken dialogue system is more closely implemented and the common ASR error recovery strategies are kept in consideration. This approach performs equally well using manually transcribed or automatically recognized speech and in different application domains.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Tangible computer readable media excludes non-statutory subject matter such as signals or energy per se as well as a wireless interface.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
   training, via a processor, an automatic speech recognition module, a spoken language understanding module and a dialog management module using task-independent call-types of a previous application;
   recognizing a received user utterance in response to a prompt to a user using the automatic speech recognition module to yield a recognized user utterance;
   classifying the recognized user utterance using the spoken language understanding module to yield a classification;
   if the recognized user utterance is classifiable by the spoken language understanding module with a confidence more than an acceptance threshold, then acting according to a call-type associated with the classification; and
   if the recognized user utterance is not classifiable by the spoken language understanding module to a predetermined rejection threshold and if a dialog-wide re-prompt counter is exceeded, then transferring the user to a human, wherein the received user utterance is transcribed, labeled and used for training the spoken dialog system, and
   wherein at least one of the acceptance threshold and the predetermined rejection threshold are related to an entity referenced in the recognized user utterance.

2. The method of claim 1, wherein if the recognized user utterance is not classifiable to a predetermined rejection threshold, then the received user utterance contains an utterance with a task-specific call-type.

3. The method of claim 1, wherein the recognized user utterance is classifiable as generic.

4. The method of claim 1, wherein the method is performed by an automated hidden human.

5. The method of claim 1, wherein the received user utterance is used to design the spoken dialog system for identifying call-types.

6. The method of claim 1, wherein the spoken dialog system performs call-type classification.

7. The method of claim 1, further comprising:
   if the recognized user utterance is not classifiable to a predetermined threshold, then re-prompting the user, wherein the step of re-prompting the user further comprises re-prompting the user to seek to get the user to identify a purpose of a call.

8. The method of claim 1, wherein the spoken language understanding module is a generic module.

9. The method of claim 1, wherein the method further comprises re-prompting the user if the received user utterance is silence.

10. A system comprising:
 a processor;
 means for controlling the processor to obtain task-independent training data;
 means for controlling the processor to present a prompt to a user;
 means for controlling the processor to recognize a received user utterance in response to the prompt using an automatic speech recognition engine to yield a recognized user utterance;
 means for controlling the processor to classify the recognized user utterance using a spoken language understanding module;
 means for controlling the processor to prompt the user if the recognized user utterance is classifiable by the spoken language understanding module with a confidence more than a predetermined acceptance threshold; and
 means for controlling the processor to transfer the user to a human if the recognized user utterance is not classifiable by the spoken language understanding module to a predetermined rejection threshold and if a dialog-wide re-prompt counter is exceeded, wherein the received user utterance is transcribed, labeled and used for training the spoken dialog system, and
 wherein at least one of the acceptance threshold and the predetermined rejection threshold are related to an entity referenced in the recognized user utterance.

11. The system of claim 10, wherein if the user utterance is not classifiable to a predetermined rejection threshold, then the utterance contains a task-specific call-type.

12. The system of claim 10, wherein the recognized user utterance is classifiable as generic.

13. The system of claim 10, wherein the system is an automated hidden human.

14. The system of claim 10, wherein the received user utterance is used to design the spoken dialog system for identifying call-types.

15. The system of claim 10, wherein the spoken dialog system performs call-type classification.

16. The system of claim 10, wherein further comprising means, if the recognized user utterance is not classifiable to a pre-determined threshold, for controlling the processor to reprompt the user, wherein the means for re-prompting the user further comprises means for re-prompting the user to seek to get the user to identify a purpose of a call.

17. The system of claim 10, wherein the spoken language understanding module is a generic module.

18. A system for gathering data for use in training a spoken dialog system, the system comprising:
 a processor; and
 a computer-readable storage medium storing instructions for controlling the processor to perform a method comprising:
  determining task-independent training data from a library formed using data from previous applications;
  recognizing a received user utterance in response to a prompt to a user using an automatic speech recognition engine to yield a recognized user utterance;
  classifying the recognized user utterance using a spoken language understanding module; and
  transferring the user to a human if the recognized user utterance is not classifiable by the spoken language understanding module to a predetermined rejection threshold and if a dialog-wide re-prompt counter is exceeded, wherein the received user utterance is transcribed, labeled and used for training the spoken dialog system,
  adjusting at least one of the acceptance threshold and the predetermined rejection threshold is based on an entity referenced in the recognized user utterance.

19. A non-transitory computer-readable medium storing instructions for controlling a computing device to gather data for use in training a spoken dialog system, the instructions comprising:
 managing a library of training data obtained from previous applications;
 recognizing a received user utterance in response to a prompt to a user using an automatic speech recognition engine to yield a recognized user utterance;
 classifying the recognized user utterance using a spoken language understanding module; and
 if the recognized user utterance is not classifiable by the spoken language understanding module to a predetermined rejection threshold and if a dialog-wide re-prompt counter is exceeded, then transferring the user to a human, wherein the received user utterance is transcribed, labeled and used for training the spoken dialog system,
 wherein the predetermined rejection threshold is related to an entity referenced in the recognized user utterance.

20. The non-transitory computer-readable medium of claim 19, wherein the recognized user utterance is classifiable as generic.

21. The non-transitory computer-readable medium of claim 19, wherein the received and classified user utterance is used to design the spoken dialog system for identifying call-types.

22. The non-transitory computer-readable medium of claim 19, wherein the spoken dialog system performs call-type classification.

23. The non-transitory computer-readable medium of claim 19, further comprising:
 if the recognized user utterance is not understood or classifiable to a predetermined acceptance threshold, then re-prompting the user, wherein the step of re-prompting the user further comprises re-prompting the user to seek to get the user to identify a purpose of a call.

24. The non-transitory computer-readable medium of claim 19, wherein the spoken language understanding module is a generic module.

25. A method comprising:
 presenting a prompt to a user in a call;
 recognizing via a processor an utterance received in response to the prompt using an automatic speech recognition module;
 classifying the utterance using a generic spoken language understanding module;
 determining whether the recognition and classification meet a threshold;
 if at least one of the recognition by the automatic speech recognition module and classification by the spoken language understanding module does not meet the threshold and if a dialog-wide re-prompt counter is exceeded, then transferring the user to a human agent wherein the utterance is transcribed, labeled and used for training the spoken dialog system; and if at least one of the recognition and classification does meet the threshold, then routing the call according to a call-type associated with the classification, wherein the threshold is related to an entity referenced in the utterance.

26. The method of claim 25, wherein the threshold is one of an acceptance threshold and a rejection threshold.

27. The method of claim 26, wherein if the recognition or the classification does not meet the threshold, the method further comprises determining whether a re-prompt counter is exceeded before re-prompting the user.

28. The method of claim 25, wherein recognizing the utterance relates to identifying the entity in the utterance.

29. The method of claim 28, wherein the entity is a named entity.

* * * * *